INVENTOR
MARC HENRI JEAN FAURE

BY
ATTORNEYS

June 2, 1970 M. H. J. FAURE 3,515,073
TRANSPORT FACILITIES WITH FLUID SUSTAINED VEHICLE
Filed Sept. 11, 1967 8 Sheets-Sheet 5

Fig.: 7a

INVENTOR
MARC HENRI JEAN FAURE
By Stevens,
ATTORNEYS

United States Patent Office 3,515,073
Patented June 2, 1970

3,515,073
TRANSPORT FACILITIES WITH FLUID SUSTAINED VEHICLE
Marc Henri Jean Faure, Saint-Maur-des-Fosses, France, assignor to Bertin et Compagnie, Paris, France, a company of France
Filed Sept. 11, 1967, Ser. No. 666,822
Claims priority, application France, Sept. 14, 1966, 76,394
Int. Cl. B60v 1/02
U.S. Cl. 104—23         7 Claims

ABSTRACT OF THE DISCLOSURE

A transport system comprising a body which moves with a systematic reduced clearance below a guide track and is lifted by vacuum generating means adapted to produce an underpressure fluid layer between the track and a rigid wall of the moving body disposed opposite the track, a facility for adjusting the underpressure so devised as to reduce the same, and therefore the lifting force, being provided in the event of a decrease of the distance between the rigid wall of the vehicle and the track and vice versa, so that the moving body is stabilised in its movement along the track.

---

This invention relates to a transport system using at least one negative pressure fluid layer produced between a guide track and a wall, the same experiencing, in opposed relationship, the ambient pressure and the reduced pressure which an appropriate device maintains in the underpressure fluid layer, the reduced pressure being controlled to give the facility stability.

The pressure difference between the inside of the fluid layer and the surrounding medium originates forces which tend to apply such wall against the guiding track.

The balance of such a system is usually unstable; assuming that it is balanced at a particular time and that the distance between the vehicle and the track then decreases, then the negative pressure in the fluid layer increases and the vehicle tends to stick to the track. The negative pressure must therefore be controlled if the facility is to be stable.

For instance, the negative-pressure generator can be controlled in dependence upon the distance between the vehicle and the track, such distance being sensed by a roller mounted on an articulated arm or by variation of an electrical capacitant or of a magnetic field or by any other appropriate means. If required, the walls which bound the negative pressure fluid layer can be so shaped that the required stability is obtained automatically.

The system according to the invention can comprise in combination overpressure fluid cushions, in which event the or each negative pressure fluid layer provides only some of the lift.

In the drawings:

FIG. 1 is a diagrammatic view of a transport facility according to the invention using a cylindrical track;

FIG. 2 is a diagrammatic view of a transport facility according to the invention comprising a plane track;

FIG. 3 is a diagrammatic view of a device using in combination overpressure fluid cushions and underpressure fluid cushions;

FIG. 6 is a view in cross-section, on the line VI—VI of FIG. 7a, of a vehicle according to the invention and of the cooperative guideway;

FIG. 10 is a view in cross-section, on the line X—X of FIG. 11, of a vehicle comprising underpressure and overpressure cushions and of the associated tracks or ways; and FIG. 11 is a section on the line XI—XI of the system shown in FIG. 10.

Referring to FIG. 1, which is a diagrammatic view of a pneumatic-lift transport facility according to the invention, a domed member 3 opens towards a substantially horizontal guideway or track 2 above it but does not bear thereon. There is therefore a gap between the base of the dome 3 and the track 2, and means will be described hereinafter for maintaining this gap and adjusting the value thereof so that the dome 3 and the loads on it can slide along the track 2.

The inside of dome 3 is connected to a duct 4 comprising a fan 5 driven in some appropriate fashion, for instance, by an electric motor. Fan 5 exhausts air in the direction indicated by arrows and maintains the pressure in the dome 3 at a value below the ambient pressure. Consequently, because of the pressure difference between the inside and outside of the dome, an upwardly directed vertical force is produced which lifts the facility 1 and the transport vehicle of which the same is a part. Details of such vehicle are not shown in FIG. 1; depending upon its weight it can comprise a varying number of facilities 1.

In FIG. 1, the track 2 has a cylindrical shape. The wall 70 of the vehicle has a shape such as to cooperate with the track 2 to bound a space in the form of two passages 71 having necks 72.

Referring to FIG. 2, a plane disc 6 bounds, opposite a plane track 2a, a space 3a which has a circular outlet 72a and in which an underpressure fluid layer is formed. Space 3a communicates with a duct comprising a fan 5. At the fan exit the duct is bent and terminates in a nozzle 7 whose axis extends parallel to the track. The gases are ejected parallel to the direction of vehicle movement and thus aid in propulsion.

FIGS. 3–7 are diagrammatic views of a facility using underpressure and overpressure fluid layers. A vehicle 8 is maintained below an inverted U-track or way 9 by an underpressure fluid layer 10 opposite the horizontal portion of the track 9. Guidance is provided by two overpressure cushions 11 which are bounded by domes 12 and which bear on the two vertical portions of the track 9. A duct 13 comprising a fan 14 is connected to the layer 10 and maintains the same, through the agency of the fan 14, at an appropriate negative pressure. The fan exhaust communicates through two tubes 15 with the domes 12, so that the fan 14 pressurizes the guide cushions 11 and exhausts the layers 10. The arrows in FIG. 3 indicate the direction of gas flow.

A lifting facility based on an underpressure fluid layer is usually unstable, for assuming that the facility is balanced at a given set of fan operating conditions and that the clearance between the vehicle and the track accidentally decreases, then the fan delivery decreases and the negative pressure increases. The bearing force therefore increases and the vehicle sticks to the track. On the other hand, if the vehicle accidentally moves away from the track, the negative pressure decreases and the vehicle drops.

The distance $d$ (see FIG. 2) between the vehicle and the track must therefore be sensed and the fan input or operating conditions must be dependent upon such distance. One form of sensing is, for instance, to use a roller A mounted on an articulated arm or push-rod B alternatively, an electrical capacitance or magnetic field can be varied. In any case, the operating conditions of the motor which drives the fan 5 or 14 (and therefore the negative pressure produced in the respective space 3a or 10) is controlled by the senser A via any appropriate transmission and control connection which is sensitive and has a very quick response time. By way of example, a signal generator C, an amplifying stage D and a control facility E for the motor and fan system are shown.

Another way of stabilising the fluid layer is for the layer-bounding walls to have a shape such that the relationship $s/S$, where $s$ denotes the exit cross-section of the fluid layer and S denotes the entry cross-section, decreases when the vehicle moves toward the track.

Figure 4:
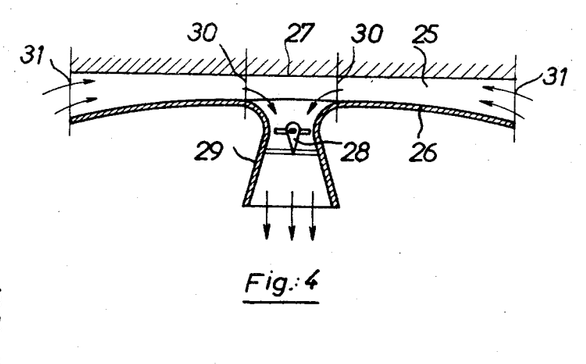
FIG. 4 is a diagrammatic view of a self-stabilising support system according to the invention.

This occurs when the distance between the walls bounding the underpressure fluid layer decreases. FIG. 4 shows a fluid layer 25 bounded by a circular disc 26 which is disposed opposite a track or way 27 and cooperates therewith to bound a convergent passage. The fan 28 in a duct 29 maintains the fluid layer 25 at a negative pressure, the air moving in the direction indicated by arrows.

The shape of the disc 26 is such that there is a constriction 30 in the path of the air in the fluid layer 25. When the vehicle moves towards the track 27, the height of the constriction 30 decreases; fan delivery therefore decreases and the negative pressure in the centre of the disc 26 increases, to give an unstabilising factor. However, since the ratio of the input cross-section at the disc periphery 31 to the cross-section at the neck 30 increases, the air velocity—and therefore the negative pressures—decreases between the periphery 31 of the fluid layer and the neck 30. In all, the lift force decreases and the device is stable, for in this case the total pressure forces acting on the disc upstream of the constriction are greater than the total forces acting on the disc downstream of the constriction when the vehicle moves away from the track. Of course, the disc 26 determining the convergent-divergent part having its neck at 30 must be rigid and must be free from local distortions of its shape.

Figure 5:
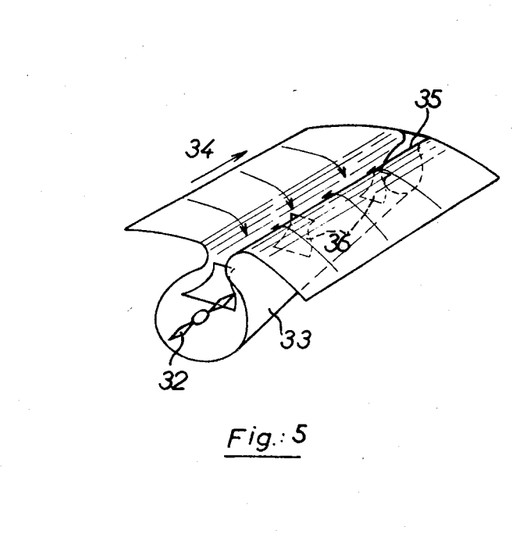
FIG. 5 is a perspective diagrammatic view of a self-stabilizing transport facility using an underpressure fluid layer.

FIG. 5 is a perspective view of a wall bounding a fluid layer, with high self-stabilising elongation whose cross-section is the same as in the facility shown in FIG. 4. Air is sucked in by a fan 32 disposed in a conical duct 33 which widens from front to rear in the direction of movement, indicated by an arrow 34. The duct 33 is closed at the front by a plate 35 and communicates with the fluid layer by a passage contrived along a generatrix. Deflectors 36 deflect the intaken air flow towards the fan and the same delivers such flow to the rear and thus provides propulsion as well as lift.

Figure 7:
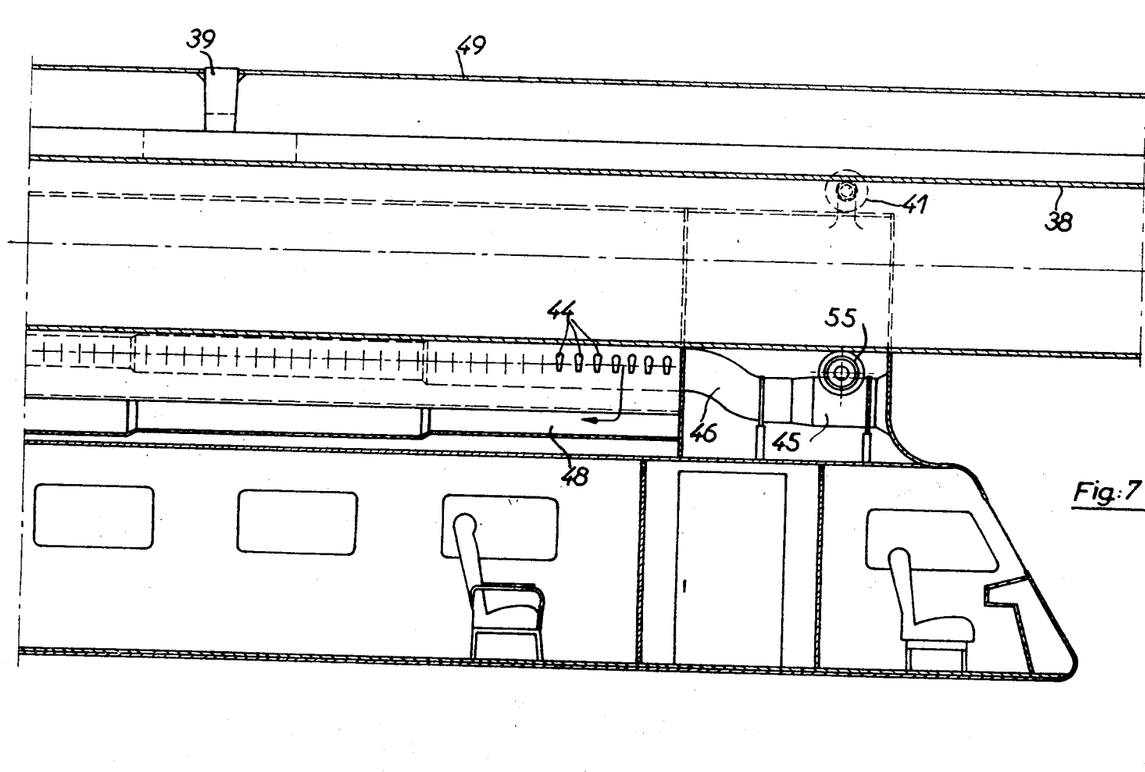
FIGS. 7 and 7a are partial sections on the line VII—VII of the facility shown in FIG. 6.
Figure 7A:
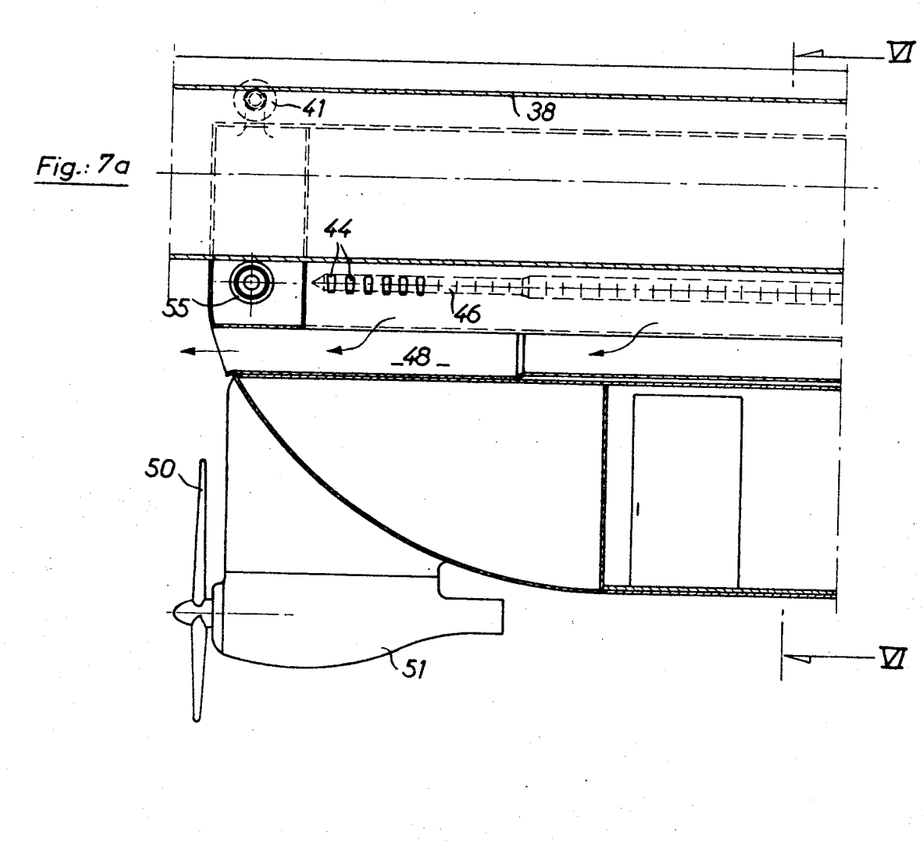

An embodiment of a transport system according to the invention and of the supporting track is shown in FIGS. 6, 7 and 7a.

A vehicle 37 for conveying passengers cooperates with a tubular aerial track 78 mounted on pylons 39. The vehicle 37 is borne by an underpressure fluid layer 40 which intimately follows the shape of the track 38; wheels 41 whose axis is horizontal can bear on the top part of the track to support the vehicle when stationary or in the event of the lift facility failing.

The fluid layer 40 is bounded by walls 42, 43 which intimately follow the shape of the tubular track 38; between the walls and the track is a gap in which injectors 44 are disposed. The same are supplied with pressure gas by a turbo jet 45 which delivers its exhaust gases into a duct 46, the cross-section thereof decreasing from the jet 45. The injectors 44 are connected in parallel to a duct 46 via tubes 47, operate as aspirators and maintain an appropriate negative pressure in the fluid layer 40. A reservoir 48 collects the gas from the injectors and the air induced thereby; the reservoir 48 is open towards the vehicle rear so that the gases can exhaust freely to atmosphere. Arrows indicate the path of the gases in FIGS. 7 and 7a. A roof 49 covers the track and provides weather protection. The vehicle is propelled by a screw 50 which is placed at the rear of the vehicle and driven by a propulsive unit 51.

The fluid layer 40 provides lift, and lateral forces are balanced by the torque exerted by vehicle weight, such torque originating when the vehicle tilts. To ensure that the vehicle cannot tilt excessively and thus strike a pylon, a safety member 52 is so secured to the pylons as to cooperate, in the event of abnormal vehicle tilt, with wheels 53; the position of the vehicle in such a case is indicated by broken lines 54.

Stability is obtained by the walls which bound the fluid layer 40 being shaped similarly to FIG. 4, with a neck 73. However, guide wheels 55 are provided to maintain a minimum distance between the vehicle and the track and can, if required, be used for propulsion and braking.

Figure 8:
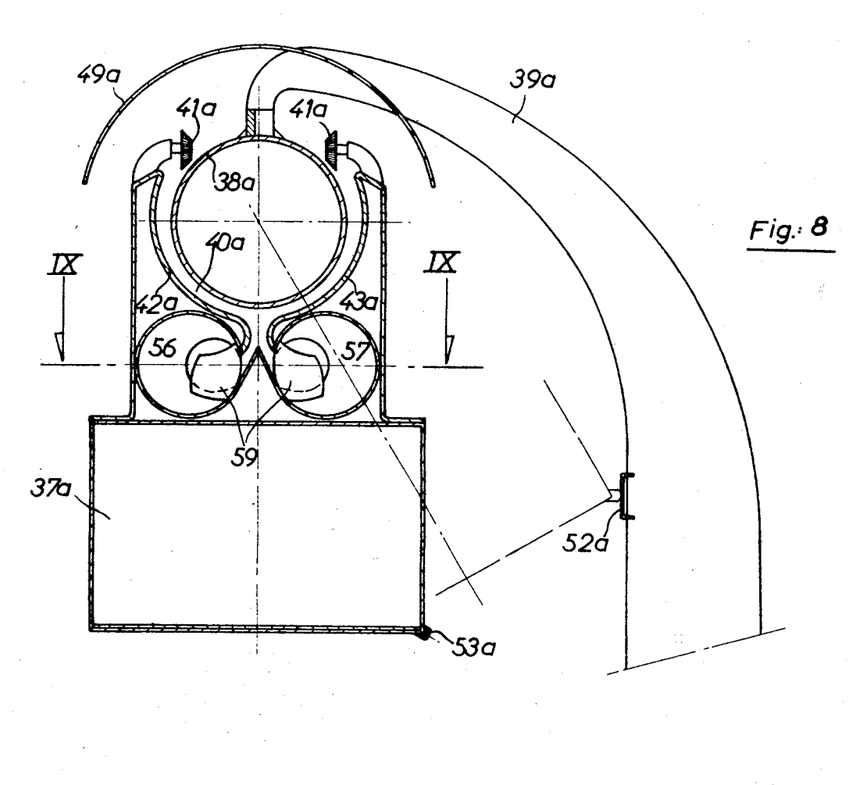
FIG. 8 is a view, in section on the line VIII—VIII of FIG. 9 of a variant of the system shown in FIG. 6.
Figure 9:
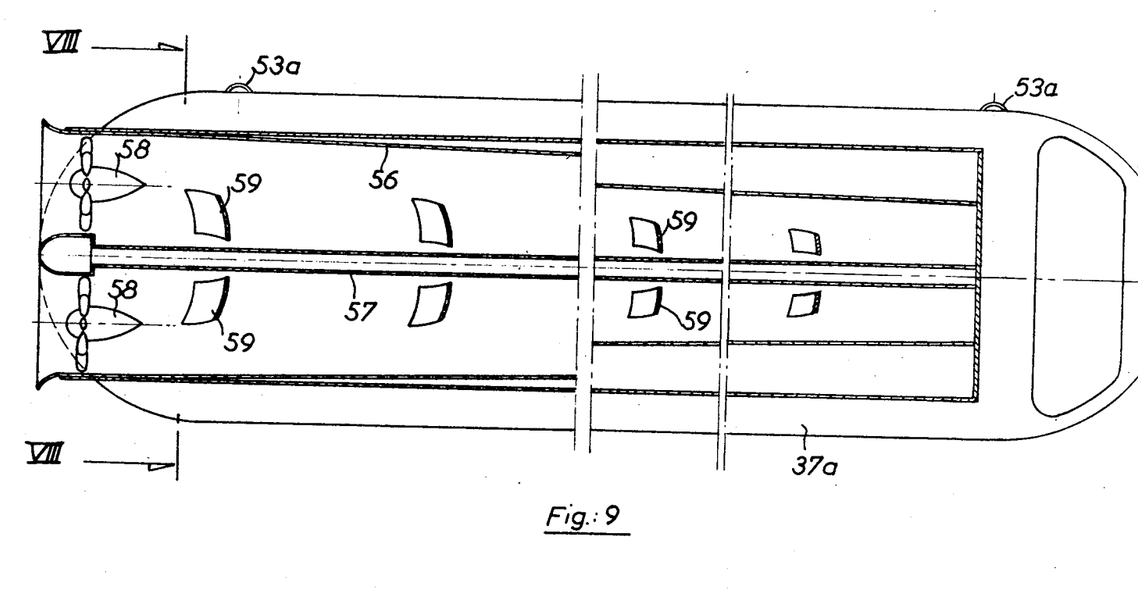
FIG. 9 is a section on the line IX—IX of the system shown in FIG. 8.

FIGS. 8 and 9 show a variant of the facility just described, integers which are common to both the facilities having the same references plus the index a.

A vehicle 37a cooperates with a tubular overhead track 38a mounted on pylons 39a. The vehicle 37a is borne by an underpressure fluid layer 40a which intimately follows the shape of the track 38a; wheels 41a whose axis is horizontal are provided to support the vehicle when the same is stationary. The fluid layer 40a is bounded by walls 42a, 43a, with a gap between them communicating with two ducts 56, 57. The same are divergent from front to rear of the facility and each have at their end a fan 58 providing negative pressure and propulsion. The ducts 56, 57 have deflectors 59 for directing the air flow appropriately. A protective roof 49a covers the track, and a safety member 52a secured to the pylons cooperates, if required, with safety wheels 53a in the event of abnormal vehicle tilt.

FIGS. 10 and 11 show a facility according to the invention associated with overpressure fluid cushions. A vehicle 37b cooperates with a tubular overhead track 38b mounted on pylons 39b and is borne by a negative pressure fluid layer 40b which intimately follows the shape of the track, wheels 41b being provided to support the vehicle when the same is stationary. The negative pressure fluid layer 40b is bounded by walls 42b, 43b, a gap being left between them in which injectors 44b are disposed. The same are supplied with the exhaust gases of a turbo jet delivering to a duct 46b which supplies the injectors in parallel with one another. The vehicle is propelled by two faired screws 60 whose air intakes extend to places 61 in the top surface of the vehicle. The inducing gas from the injectors and the air induced thereby goes through ducts 62 to a reservoir 63 below the vehicle. Reservoir 63 supplies overpressure gas cushions 64, 65 which cooperate with a bottom guide track 66. The cushions 64 are disposed opposite a substantially horizontal part of the track 66 and provide some of the lift for the vehicle. The cushions 65 are for guiding and bear on substantially vertical portions of the track 66. The cushions 64, 65 are bounded laterally by deformable walls.

What is claimed is:

1. A transportation system comprising a track having an elevated downwardly exposed undersurface, a body movable below said track undersurface in fluidic correlation therewith and comprising an upwardly exposed overtopping plate made of rigid material extending opposite and adjacent said track undersurface and defining therewith a passage of undeformable outline which is convergent over a major part of its extension, and pumping means sucking from said passage to create therein a negative cushion under relative vacuum whereby a fluidic lift effect develops on said rigid plate mainly on the portion thereof bounding said major convergent part of said passage.

2. A transportation system as claimed in claim 1, wherein said rigid plate defines with said track undersurface a convergent-divergent passage which is divergent over a minor part of its extension.

3. A transportation system as claimed in claim 1, wherein said body further comprises a jet propulsion nozzle substantially parallel to said track undersurface and connected to the delivery side of said pumping means, said passage being connected to the suction side of said pumping means.

4. A transportation system as claimed in claim 1, wherein said pumping means comprises an air ejector device connected to said passage to induce air by suction therefrom, and a gas turbine unit supplying motive gases to said air ejector device to entrain air therethrough.

5. A transportation system as claimed in claim 1, wherein said track further comprises a laterally exposed side surface, and said body further comprises means for containing a positive cushion under relative overpressure formed against said side surface, said positive cushion containing means being connected to the delivery side of said pumping means, and said passage being connected to the suction side of said pumping means.

6. A transportation system as claimed in claim 5, wherein said track comprises a substantially horizontal undersurface at its top, and a substantially vertical side surface underneath said undersurface.

7. A transportation system as claimed in claim 6, wherein said track is of substantially inverted U-shaped cross-section.

References Cited
UNITED STATES PATENTS

| | | | |
|---|---|---|---|
| 1,698,482 | 1/1929 | Nicin | 180—15 |
| 3,125,964 | 3/1964 | Silverman | 104—89 |
| 3,233,556 | 2/1966 | McDonald | 104—136 |
| 3,167,145 | 1/1965 | Mackie | 212—134 |

ARTHUR L. LA POINT, Primary Examiner

R. A. BERTSCH, Assistant Examiner

U.S. Cl. X.R.

104—138; 105—148, 150